US 8,045,175 B2

(12) United States Patent
De Groot et al.

(10) Patent No.: US 8,045,175 B2
(45) Date of Patent: Oct. 25, 2011

(54) EQUAL-PATH INTERFEROMETER

(75) Inventors: Peter J. De Groot, Middletown, CT (US); Leslie L. Deck, Middletown, CT (US); James F. Biegen, Middletown, CT (US); Chris Koliopoulos, Tucson, AZ (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 12/818,753

(22) Filed: Jun. 18, 2010

(65) Prior Publication Data

US 2011/0007323 A1 Jan. 13, 2011

Related U.S. Application Data

(60) Provisional application No. 61/218,703, filed on Jun. 19, 2009.

(51) Int. Cl.
*G01B 11/02* (2006.01)
*G01B 9/02* (2006.01)
(52) U.S. Cl. .................. 356/497; 356/511; 356/519
(58) Field of Classification Search .............. 356/450, 356/497, 511–514, 519
See application file for complete search history.

(56) References Cited

U.S. PATENT DOCUMENTS

| 5,398,112 A * | 3/1995 | Ai et al. .................... 356/514 |
| 6,195,168 B1 | 2/2001 | De Lega et al. ............ 356/497 |
| 6,744,522 B2 * | 6/2004 | De Groot et al. .......... 356/503 |
| 6,882,432 B2 | 4/2005 | Deck |
| 6,992,779 B2 * | 1/2006 | Ueki ........................... 356/512 |
| 7,379,188 B2 * | 5/2008 | Jansen ........................ 356/495 |
| 2005/0259265 A1 | 11/2005 | De Lega ..................... 356/497 |
| 2006/0066874 A1 * | 3/2006 | Ueki ........................... 356/512 |
| 2006/0158659 A1 | 7/2006 | De Lega et al. ............ 356/497 |
| 2008/0094630 A1 | 4/2008 | Mieher et al. .............. 356/401 |
| 2008/0304075 A1 | 12/2008 | Rembe ........................ 356/457 |

OTHER PUBLICATIONS

Ai, "Multimode laser Fizeau interferometer for measuring the surface of a thin transparent plate," Appl. Opt. 36:8135-8148, Nov. 1, 1997.
de Groot, "Measurement of transparent plates using wavelength-tuned phase shifting interferometry," Appl. Opt. 39:2658-2663, Jun. 1, 2000.
Emer et al., "Ultraviolet Interferometry with Apochromatic Reflection Optics", Applied Optice 38:3516-3522, Jun. 1, 1999.
Freischlad, "Large flat panel profiler", SPIE 2862:163-171, (1996).
Schwider, "White-light Fizeau interferometer," Applied. Optics 36:1433-1437, Mar. 1, 1997.
"Notification of Transmittal of The International Search Report and The Written Opinion of the International Searching Authority, or the Declaration", International Application No. PCT/US2010/039125, 9 pages, Feb. 18, 2011.

* cited by examiner

*Primary Examiner* — Michael A Lyons
(74) *Attorney, Agent, or Firm* — Fish & Richardson P.C.

(57) ABSTRACT

An optical assembly for use in an interferometer is provided. The optical assembly includes first and second partially reflective surfaces positioned along an optical axis and oriented at different non-normal angles to the optical axis. The second partially reflective surface is configured to receive light transmitted through the first partially reflective surface along the optical path, transmit a portion of the received light to a test object to define measurement light for the interferometer and reflect another portion of the received light back towards the first partially reflective surface to define reference light for the interferometer. The reference light makes at least one round trip path between the second and first partially reflective surfaces.

51 Claims, 14 Drawing Sheets

EQUAL-PATH INTERFEROMETER

CROSS REFERENCE TO RELATED APPLICATIONS

Pursuant to 35 USC §119(e), this application claims the benefit of prior U.S. Provisional Application 61/218,703, filed Jun. 19, 2009, the content of which is incorporated by reference in its entirety.

FIELD OF THE INVENTION

The invention relates to equal-path interferometers as well as to related methods.

BACKGROUND

Interferometers use interfering beams to perform measurements of objects. The interferometers may be broadly classified as equal-path, in which the interfering beams have traversed nearly equal optical distances (e.g., equal to within a few tens of microns), and unequal-path, for which the optical path difference is large compared to the coherence length of visible white light (e.g., greater than 0.05 mm and potentially up to several kilometers). Equal-path systems can be configured to operate with low-coherence (spectrally-broadband and/or spatially extended) light sources. Unequal-path interferometers include, e.g., laser Fizeau, which can be used for testing optical components.

Equal path interferometers are of interest in optical testing, e.g., for separately measuring the front- and back-surfaces of a semi-transparent object. Equal path interferometers can also be used in interference microscopy, where low-coherence halogen lamps and white-light LED's can be used as light sources. For example, interference microscopy designs can be based on path-balanced and dispersion-compensated Mirau, Michelson or Linnik interferometers.

SUMMARY

In general, in one aspect, an interferometer provides approximately equal measurement and reference path lengths, the measurement path extending to a surface of a test object, the reference path extending to a surface of a reference element, allowing the use of light from a low-coherence source. An application of the interferometer is the profiling of selected surfaces of a partially-transparent object while being substantially insensitive to other object surfaces. In some implementations, unequal-path laser Fizeau instruments are adapted to an equal-path geometry. In some implementations, the interferometer functions as an interference objective for a microscope, e.g., a microscope that employs a low-coherence light source.

In general, in another aspect, an interferometer is provided, in which the interferometer includes a light source, a reference element, an interferometer beamsplitter, an aperture stop or its equivalent for filtering unwanted reflections, and an imaging device such as a camera. A portion of the incoming source light passes through a partially-reflective surface of the reference element to the interferometer beamsplitter. The beamsplitter divides the portion of the source light into reference and measurement beams. The reference beam then reflects from the partially-reflective reference surface of the reference element, travels back to the interferometer beamsplitter, reflects once again from the beamsplitter, and then passes through the reference element and eventually passes through the aperture stop to the camera. The measurement beam, after transmitting through the beamsplitter, reflects from at least one object surface such that the measurement beam returns to the interferometer beamsplitter and combines approximately coextensively and coaxially with the reference beam, resulting in an interference pattern at the camera. The reference element and the beamsplitter are tilted in such a way that spurious reflections from the various surfaces of the interferometer components are blocked by the aperture stop or its equivalent, resulting in a two-beam interference pattern at the imaging device.

In general, in another aspect, an optical assembly for use in an interferometer is provided. The optical assembly includes first and second partially reflective surfaces positioned along an optical axis and oriented at different non-normal angles to the optical axis. The second partially reflective surface is configured to receive light transmitted through the first partially reflective surface along the optical path, transmit a portion of the received light to a test object to define measurement light for the interferometer and reflect another portion of the received light back towards the first partially reflective surface to define reference light for the interferometer, in which the reference light makes at least one round trip path between the second and first partially reflective surfaces.

Implementations of the optical assembly may include one or more of the following features. The non-normal angles can cause the reference light to pass between the first and second partially reflective surfaces at least one time before the second partially reflective surface reflects the reference light back along the optical axis. The non-normal angles can cause the reference light to contact one of the partially reflective surfaces at normal incidence during one of the passes there between.

The non-normal angle for the first partially reflective surface can be one and a half times the non-normal angle for the second partially reflective surface.

The second partially reflective surface can be configured to combine the measurement light, after the measurement light reflects from the test object back to the second partially reflective surface, with the reference light, after the reference light makes the at least one round trip between the second and first partially reflective surfaces.

The optical assembly can include a first optical element having the first partially reflective surface and a second optical element can have the second partially reflective surface. The first and second optical elements each can have another surface having an anti-reflection coating. The partially reflective surfaces can be on outer surfaces of the optical elements respectively. The partially reflective surfaces can be formed at respective internal interfaces within the optical elements.

The first partially reflective surface can be spaced away from the second partially reflective surface at a distance that is greater than a depth of focus of an imaging module that captures an interference pattern between the reference light and the measurement light. Optical elements of the interferometer can be positioned such that the reference light does not pass through glass within the depth of focus of the imaging module.

The first optical element can have another surface having an anti-reflection coating. The first optical element can be oriented such that the first partially reflective surface faces towards the second partially reflective surface of the second optical element, and the anti-reflection coating of the first optical element faces away from the second partially reflective surface. A distance between the first partially reflective surface and the second partially reflective surface can be greater than a depth of focus of an imaging module for capturing an interference pattern between the reference light and the measurement light.

The optical assembly can include a dispersion compensator positioned between the first optical element and the second optical element to compensate for a phase difference between the measurement light and the reference light, the dispersion compensator being positioned closer to the third optical element and outside of the depth of focus of the imaging system.

The first optical element can be oriented such that the first partially reflective surface faces away from the second partially reflective surface of the second optical element, and the anti-reflection coating of the first optical element faces towards the second partially reflective surface.

The optical assembly can further include a third partially reflective surface. The third partially reflective surface can be configured to i) receive light transmitted through the first partially reflective surface along the optical path; ii) transmit a portion of the received light to the test object to define the measurement light; and iii) reflect another portion of the received light back towards the first partially reflective surface to define a second reference light for the interferometer, wherein the second reference light makes at least one round trip path between the second and first partially reflective surfaces.

The optical assembly can further include a collimator to receive light from a light source and project collimated light to the first partially reflective surface. The optical assembly can further include a field lens to receive light from a light source and project the light to the first partially reflective surface, the field lens being positioned outside of an imaging path traveled by the reference light after the reference light is reflected by the first partially reflective surface and before the reference light is detected by a detector.

The first partially reflective surface can have a reflectivity in the range of about 10% to about 30%. The second partially reflective surface can have a reflectivity in the range of about 40% to about 60%.

An interferometry system can include the optical assembly described above and an interferometer base that includes a light source and a detector. The light source can be configured to produce the light transmitted through the first partially reflective surface and received by the second partially reflective surface. The detector can be configured to receive combined light that includes the measurement light and the reference light and provide information about a spatial distribution of the combined light. The interferometer base can include an aperture stop positioned to block light from the interferometer base that contacts the first partially reflective surface along the optical axis and reflects from the first partially reflective surface back to the interferometer base and a mount for supporting the test object. The mount can be positioned to define an optical path length for the measurement light that is substantially equal to an optical path length for the reference light.

The interferometer base can include a phase shifter for varying the optical path length difference between the measurement light and the reference light. The phase shifter can mechanically couple the interferometer base to the optical assembly and can be configured to vary the distance between the optical assembly and the test object to vary the optical path length for the measurement light.

The source can be a broadband source for providing low-coherence interferometry measurements.

The source can be a narrow-band laser source.

The source can be adjustable between a broadband mode for low-coherence interferometry and a laser mode for high-coherence interferometry. The source can be a laser diode that operates in the broadband mode when driven at a current below its laser threshold and operates in the laser mode when driven at a current above its laser threshold.

The first partially reflective surface can include a non-planar surface.

In general, in another aspect, an interferometry method includes positioning first and second partially reflective surfaces along an optical axis, orienting the first and second partially reflective surfaces at different non-normal angles relative to the optical axis, and transmitting light through the first partially reflective surface along a direction parallel to the optical axis to the second partially reflective surface. At the second partially reflective surface, a first portion of the light is transmitted to a test object to define measurement light, and a second portion of the light is reflected back towards the first partially reflective surface to define reference light. At the first partially reflective surface, a portion of the second portion of the light is reflected towards the second partially reflective surface such that the reference light makes at least one round trip path between the second and first partially reflective surfaces.

Implementations of the interferometry method can include one or more of the following features. Orienting the first and second partially reflective surfaces can include orienting the first and second partially reflective surfaces at different non-normal angles to cause the reference light to pass between the first and second partially reflective surfaces at least one time before the second partially reflective surface reflects the reference light back along the optical axis.

Orienting the first and second partially reflective surfaces can include orienting the first and second partially reflective surfaces at different non-normal angles to cause the reference light to contact one of the partially reflective surfaces at normal incidence during one of the passes there between.

The method can include, at the second partially reflective surface, combining the measurement light, after it reflects from the test object back to the second partially reflective surface, with the reference light, after it makes the at least one round trip between the second and first partially reflective surfaces. Information about a spatial distribution of the combined light can be provided. An aperture stop can be provided to block light that is reflected from the first partially reflective surface in a direction away from the second partially reflective surface. A test object having a reflective surface can be positioned to define an optical path length for the measurement light that is substantially equal to an optical path length for the reference light. The optical path length difference between the measurement light and the reference light can be varied. The distance between an optical assembly and the test object can be varied to change the optical path length for the measurement light, in which the optical assembly includes the first and second partially reflective surfaces.

The method can include orienting an optical element having the first partially reflective surface at an outer surface of the optical element such that the outer surface of the optical element having the first partially reflective surface faces towards the second partially reflective surface. The method can include transmitting the reference light from the first partially reflective surface to the second partially reflective surface without passing any glass element. The method can include positioning the second partially reflective surface at a distance away from the first partially reflective surface, the distance being greater than a depth of focus of an imaging module that detects an interference pattern between the measurement light and the reference light.

The method can include passing the reference light through a dispersion compensator that compensates a difference in phase between the measurement light and the reference light due to differences in optical path lengths traveled by the reference light and the measurement light, and positioning the dispersion compensator outside of the depth of focus of the imaging module.

The method can include positioning a third reflective surface along the optical axis; orienting the third partially reflective surface to be parallel to the second partially reflective surface; at the third partially reflective surface, transmitting a third portion of the light transmitted by the first partially reflective surface to the test object to define the measurement light, and reflecting a fourth portion of the light back towards the first partially reflective surface to define a second reference light; and at the first partially reflective surface, reflecting a portion of the fourth portion of the light towards the second partially reflective surface such that the second reference light makes at least one round trip path between the second and first partially reflective surfaces.

Transmitting light through the first partially reflective surface can include transmitting collimated light through the first partially reflective surface. The method can include transmitting the light through a field lens prior to transmitting the light through the first partially reflective surface, and positioning the field lens outside of an imaging path traveled by the reference light after the reference light is reflected by the first partially reflective surface and before the reference light is detected by a detector.

Although described herein as an interferometer for flat surface testing, the same concepts may be generalized for the measurement of any surface shape, with appropriate changes in the reference element.

DETAILED DESCRIPTION

Figure 1:
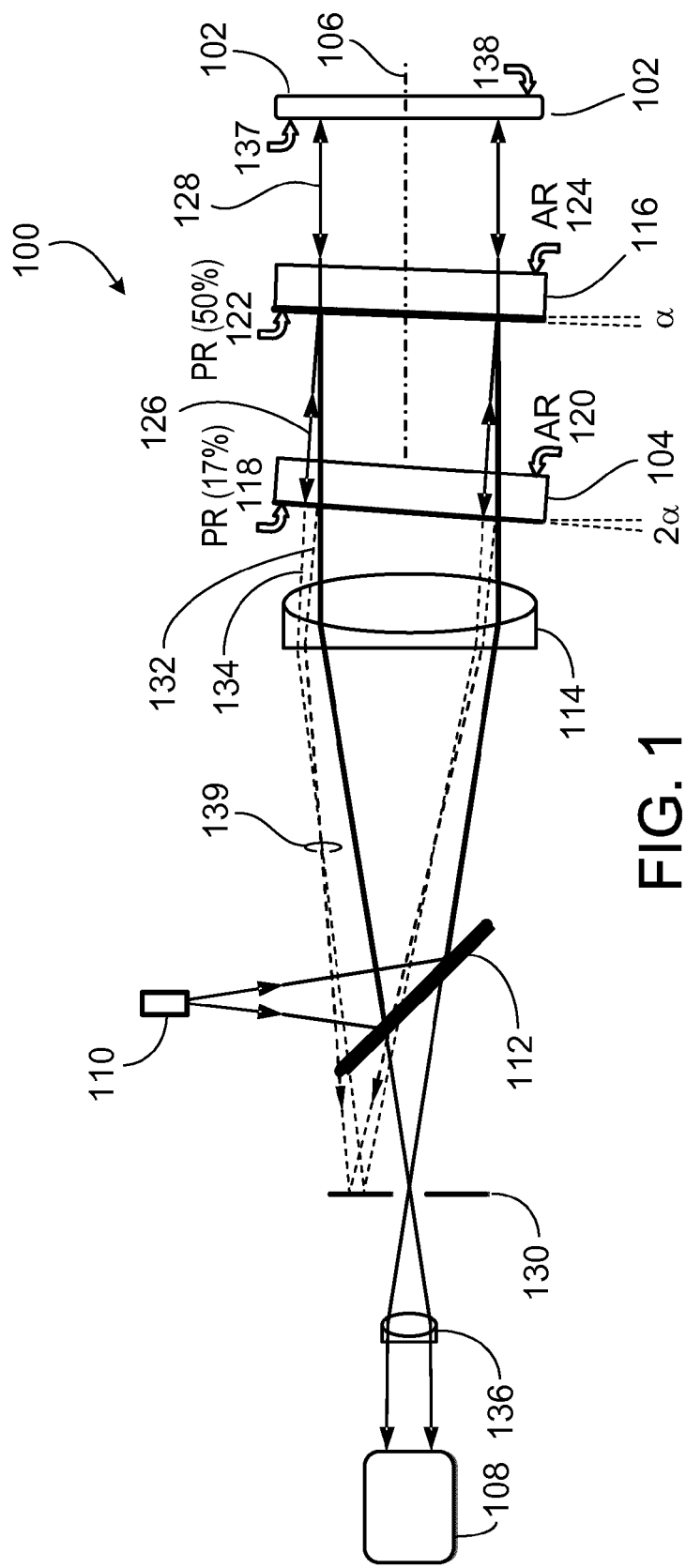
FIG. 1 is a diagram of an example interferometer for measuring a surface of an object.

Referring to FIG. 1, an example interferometer 100 is provided for analyzing the front surface form or other characteristic of an object. The interferometer 100 includes an optical assembly to provide a measurement path to a surface of a test object 102 and a reference path to a surface of a reference element 104, in which the measurement and reference paths have approximately equal path lengths. In this example, the reference element 104 is a glass plate having flat surfaces. The optical assembly includes multiple partially reflective surfaces positioned along an optical axis 106 of the interferometer 100 and tilted at angles relative to the optical axis 106 such that useful measurement and reference light is directed along the optical axis 106 toward a detector (e.g., a camera 108), and unwanted light is directed along directions non-parallel to the optical axis 106 and filtered out. This allows the use of a low-coherence light source 110 and facilitates the measurement of transparent objects having multiple reflective surfaces.

Here, the term "light" can refer to electromagnetic radiation in any of the ultraviolet, visible, near-infrared, and infrared spectral regions.

An illumination beamsplitter 112 directs light from the light source 110 through a collimator 114, which collimates the light and directs the light along a direction parallel to the optical axis 106 towards the reference element 104 and an interferometer beamsplitter 116. The reference element 104 has a partial-reflection (PR) coating 118 on a surface facing the collimator 114, and an anti-reflection (AR) coating 120 on a surface facing the beamsplitter 116. Because the PR coating 118 and AR coating 120 are thin, the terms "PR coating 118" and "PR surface 118" will be used interchangeably, and the terms "AR coating 120" and "AR surface 120" will be used interchangeably. The beamsplitter 116 has a partial-reflection (PR) coating 122 on a surface facing the reference element 104, and an anti-reflection (AR) coating 124 on a surface facing the test object 102. Because the PR coating 122 and AR coating 124 are thin, the terms "PR coating 122" and "PR surface 122" will be used interchangeably, and the terms "AR coating 124" and "AR surface 124" will be used interchangeably.

The light from the collimator 114 passes the PR coating 118 of the reference element 104. As an example, the PR coating 118 reflects 17% and transmits 83% of the incident light. Thus, 83% of the light passes through the AR coating 120 of the reference element 104 and propagates to the PR coating 122 of the beamsplitter 124, which, in this example, reflects 50% and transmits 50% of the incident light. The reflected light forms a reference beam 126, and the transmitted light forms a measurement beam 128.

The reference beam 126 passes the AR surface 120 of the reference element 104 and partially reflects from the PR surface 118 of the reference element 104. Thus the PR surface 118 of the reference element 104 serves as a reference surface. The reflected reference beam 126 then returns to the PR surface 122 of the beamsplitter 116, at which point it partially reflects into a path that is approximately collinear and coextensive with the original illumination (and parallel to the optical axis 106), but traveling in the opposite direction, eventually reaching the camera 108 after passing through an aperture stop 130 and an imaging lens 136.

The example above is useful for measuring a test object having surface reflectivities ranging from 4% to 100%. Depending on application, the reflectivity and transmissivity values can be different from those provided above. For example, the PR surface 118 of the reference element 104 can have a reflectivity in the range of about 10% to about 30%, and the PR surface 122 of the beamsplitter 116 can have a reflectivity in the range of about 40% to about 60%.

In this example, the reference beam 126 travels round-trip from the PR surface 122 of the beamsplitter 116 to the PR surface 118 of the reference element 104 and then back to the PR surface 122. As described below (FIG. 8), the tilt angle of the reference element 104 can be adjusted such that the reference beam 126 travels two or more round-trips between the PR surface 122 of the beamsplitter 116 and the PR surface 118 of the reference element 104 before the reference beam 126 combines with the measurement beam 128, as described below. This allows the distance from the PR surface 122 of the beamsplitter 116 to the surface of the test object 102 to be increased, while maintaining equal path lengths between the measurement beam 128 and the reference beam 126.

The measurement beam 128 passes through the AR surface 124 of the interferometer beamsplitter 116 to the test object 102, where the measurement beam 128 reflects from at least one surface (e.g., a front surface 137) of the test object 102 back to the interferometer beamsplitter 116, where a portion of the measurement beam 128 transmits through the remaining elements along a path approximately coextensive and collinear with the original illumination (and parallel to the optical axis 106), eventually reaching the camera 108, where the measurement beam 128 interferes with the reference beam 126. The result is a two-beam interference pattern that is useful in, e.g., determining the surface profile of the test object 102.

In the example of FIG. 1, the measurement beam 128 (after being reflected from the surface of the test object 102) and the reference beam 126 (after traveling round-trip between the PR surfaces 122 and 118) are combined or overlapped at the PR surface 122 of the beamsplitter 116. The overlapping beams then travel toward the camera 108.

In addition to the portions of the reference beam 126 and measurement beam 128 that are directed to the camera 108, the reference element 104 and the interferometer beamsplitter 116 (among other possible sources of accidental reflection) may generate unwanted reflections (such as 139). To isolate and remove the unwanted reflections 139, the reference element 104 and the interferometer beamsplitter 116 are slightly angled, as shown in the figure, so as to direct the unwanted reflections 139 outside of the clear aperture of the aperture stop 130.

FIG. 1 shows an example of the unwanted first reflection 132 from the PR surface 118 of the reference element 104, and the unwanted portion 134 of the reference beam 126 that transmits through the reference element 104 rather than reflecting back towards the interferometer beamsplitter 116. The unwanted first reflection 132 and the unwanted portion 134 are blocked by the aperture stop 130.

In the example of FIG. 1, the interferometer beamsplitter 116 is tilted by an angle $\alpha$ with respect to an orientation perpendicular to the optical axis 106. The reference element 104 is tilted by an angle substantially equal to $2\alpha$ so that the reference beam 126 impinges upon the PR surface 118 of the reference element 104 at approximately normal incidence.

Figure 2:
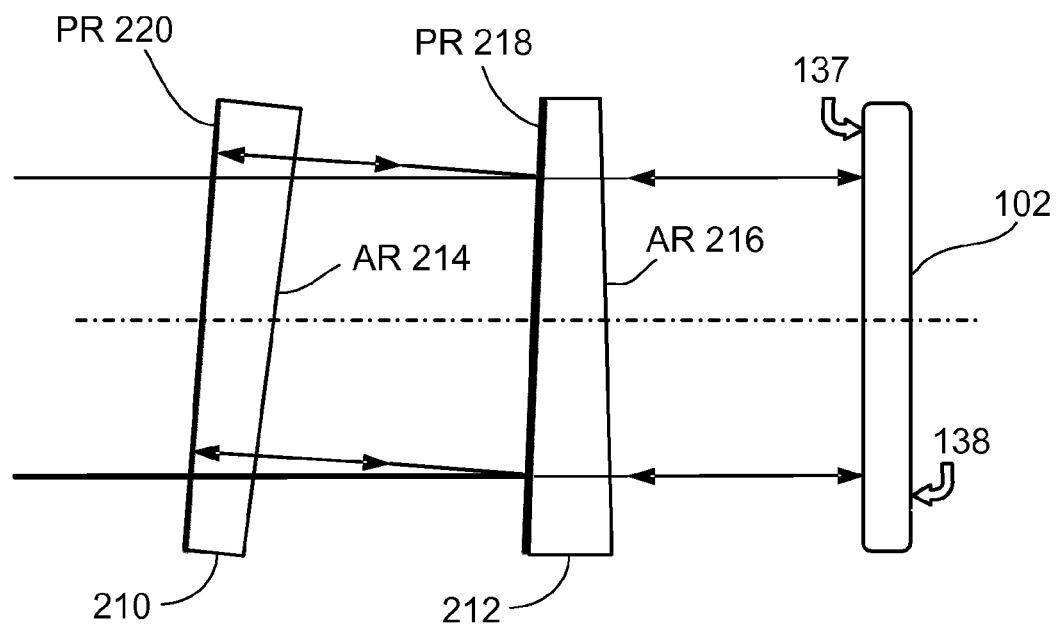
FIGS. 2 and 3 are diagrams of example optical assemblies arranged to have equal path lengths for a reference beam and a measurement beam.

Referring to FIG. 2, in some implementations, to further suppress unwanted reflections from the AR surfaces of the reference element 104 and of the interferometer beamsplitter 116, the reference element 104 and the beamsplitter 116 can be made of wedged substrates 210 and 212, respectively. In this example, the wedged substrate 212 has a PR surface 218 facing the reference element and an AR surface 216 facing the test object 102, in which the PR surface 218 and the AR surface 216 are non-parallel. The wedged substrate 210 has a PR surface 220 facing the collimator 114 and an AR surface 214 facing the beamsplitter, in which the PR surface 220 and the AR surface 214 are non-parallel. The PR surface 218 and the PR surface 220 are tilted by angles substantially equal to $\alpha$ and $2\alpha$, respectively, with respect to an orientation perpendicular to the optical axis 106. By using wedged substrates 210 and 212, unwanted reflections from AR surfaces 214 and 216 will travel in directions at an angle relative to the measurement and reference beams, and eventually blocked by the aperture stop 130.

In the example of FIG. 1, the surface being viewed or measured is the front surface 137 of the test object 102. The interferometer 100 can also be used to view or measure the back surface 138 of the test object 102. The surface being measured do not necessarily have to be outer surfaces of an object. The interferometer 100 can also view or measure an internal interface within an optical element.

The interfering pattern detected by the camera 108 can be analyzed by, e.g., a computer (not shown) executing programs. Analysis of the interfering pattern can provide information about, e.g., whether the surface 137 of the object 102 matches or deviates from a desired surface profile.

In the example of FIG. 1, the interferometer is insensitive to the polarization of light. The illumination beamsplitter 112 reflects a portion (e.g., half) of the light from the light source 110 towards the collimator 114, and passes a portion (e.g., half) of the return light from the collimator 114 to the camera 108. In some implementations, the interferometer can also be configured to use polarized light. A polarized illumination beamsplitter is used, and a quarter wave plate is positioned between the beamsplitter and the collimator 114 to rotate the polarization state of light. The polarized illumination beamsplitter directs substantially all of light polarized along a first direction (through the quarter wave plate) to the collimator 114, and passes substantially all of the return light (which passed the quarter wave plate a second time) polarized along a second direction to the camera 108.

Figure 3:
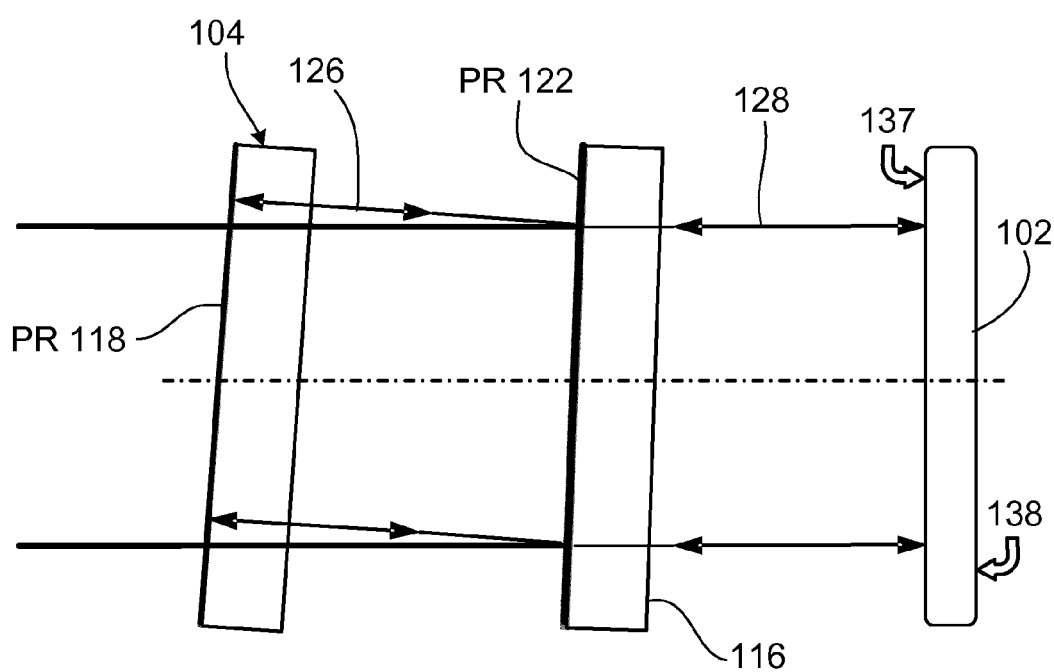

Referring to FIG. 3, a benefit of the inventive geometry for the reference element 104 and the interferometer beamsplitter 116 is that they can be configured to have equal path lengths for the reference beam 126 and the measurement beam 128, as well as equal amounts of glass in both paths. For example, the thickness of the glass for the reference element 104 can be the same as the thickness of the glass for the beamsplitter 116. In this example, the path length traveled by the measurement beam 128 from the PR surface 122 of the beamsplitter 116 to the front surface 137 of the object 102 and back to the PR surface 122, is equal to the path length traveled by the reference beam 126 from the PR surface 122 to the PR surface 118 of the reference element 104 and back to the PR surface 122.

Variations in environmental conditions, such as temperature, cause substantially the same amount of phase variations in the reference beam 126 and measurement beam 128. This is useful in, e.g., low-coherence interferometry, where is it important to maintain the same optical path lengths for the measurement and reference beams. In some examples, the thicknesses of reference element 104 and the beamsplitter 116 may differ, and an additional optical element may be used to partly or fully correct for phase differences caused by such differences.

If the back surface 138 of the test object 102 or a surface within the body of the test object 102 is to be measured, the distance between the test object 102 and the beamsplitter 116 can be adjusted such that the round-trip optical path length traveled by the measurement beam from the PR surface 122 to the surface sought to be measured, is equal to the round-trip optical path length traveled by the reference beam from the PR surface 122 to the PR surface 118. Note that because the refractive index of the test object may be different from the refractive index of air, the physical distance traveled by the measurement beam may be different from the physical distance traveled by the reference beam even though the optical path lengths for the measurement and reference beams are the same.

In the example of FIG. 2, the reference element 210 and the beamsplitter 212 also provide equal path lengths for the measurement and reference beams.

Another benefit of the inventive design is that it is compatible with the overall geometry and mechanical design of commercial laser Fizeau interferometers, such as the Zygo GPI™ series of interferometers, available from Zygo Corporation, Middlefield, Conn.

Figure 4:
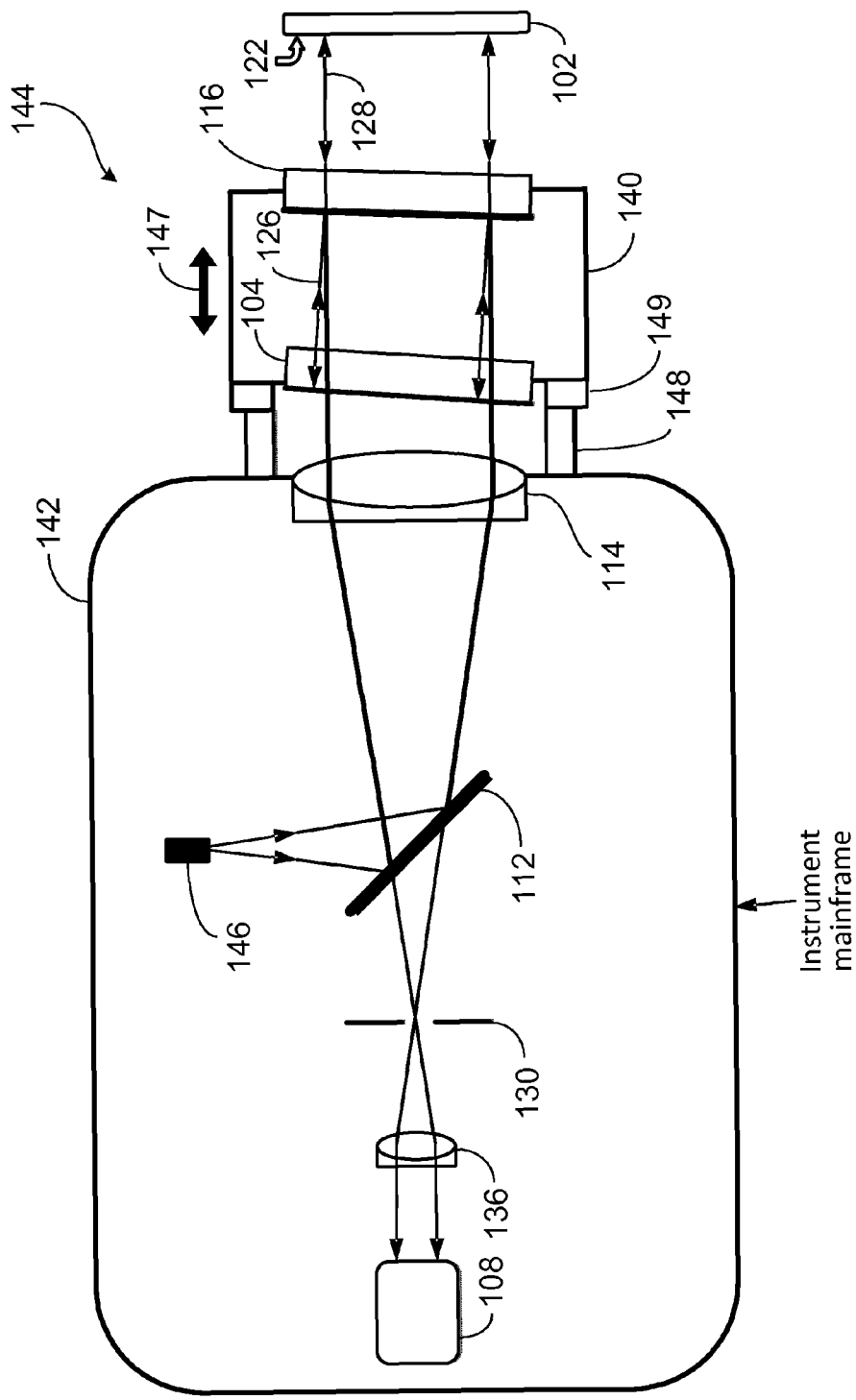
FIG. 4 is a diagram of an example interferometer for phase shifting interferometry.

Referring to FIG. 4, an example equal-path interferometer 144 can be used for phase shifting interferometry. The interferometer 144 includes an instrument mainframe 142 and an interferometer sub-assembly 140. The interferometer sub-assembly 140 is an accessory that may be attached or removed from the mainframe 142 of the instrument, depending on the application. The mainframe 142 includes a light source 146, an illumination beamsplitter 112, a collimator 114, an aperture stop 130, an imaging lens 136, and a camera 108, similar to those shown in the example of FIG. 1. The light source 146 can be either a laser source or a low-coherence light source.

In some implementations, the light source 146 can be adjustable between a broadband mode for low-coherence interferometry and a laser mode for high-coherence interferometry. For example, the light source 146 can be a laser diode that operates in the broadband mode when driven at a current below its laser threshold and operates in the laser mode when driven at a current above its laser threshold.

The interferometer sub-assembly 140 includes an interferometer beamsplitter 116 and a reference element 104, similar to those shown in the example of FIG. 1. The position of the sub-assembly 140 can be adjusted (represented by 147) by a mechanical phase shifter 148, which can have an accuracy in the order of, e.g., 1 micron. The phase shifter 148 varies the optical path length difference between the measurement beam 128 and the reference beam 126. In this example, the phase shifter 148 mechanically couples the interferometer sub-assembly 140 to a base on the instrument mainframe 142 and is configured to vary the distance between the sub-assembly 140 and the test object 102 to vary the optical path length for the measurement beam 128.

The sub-assembly 140 can be configured as a demountable accessory that can be mounted on the instrument mainframe 142 through an accessory mounting flange 149. In this example, the interferometer 144 is compatible with illumination of arbitrary polarization.

In some implementations, it is possible to configure the interferometer 144 to utilize polarized light such that the measurement beam and the reference beam have specific polarizations along particular portions of the measurement path and reference path, respectively.

When a low-coherence light source 146 is used, the equal-path interferometer 144 allows for the measurement of specific surfaces of, e.g., a transparent object having multiple reflecting surfaces. In low-coherence interferometry, the interference effect is restricted or localized to the equal-path condition.

Figure 5:
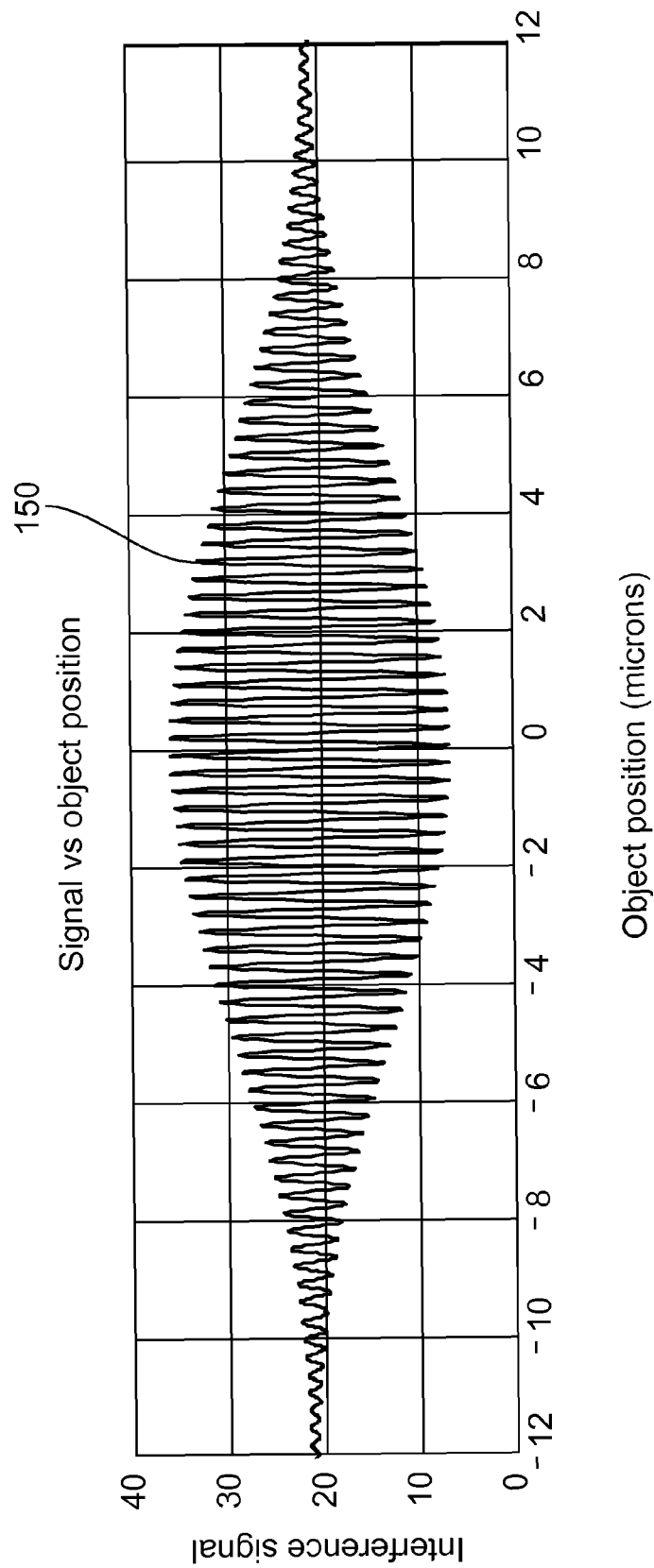
FIGS. 5 and 6 are graphs.

FIG. 5 shows an example interference signal 150 that varies as a function of object position for a transparent object when measured with a spectrally-broadband (600 nm center wavelength, 15 nm full width at half maximum (FWHM)) light source. An object position of "zero" is equivalent to the equal-path condition. In this example, the amplitude of the envelope of the interference signal 150 is high near the zero position, and is reduced considerably at positions beyond 12 microns from the zero position.

Figure 6:
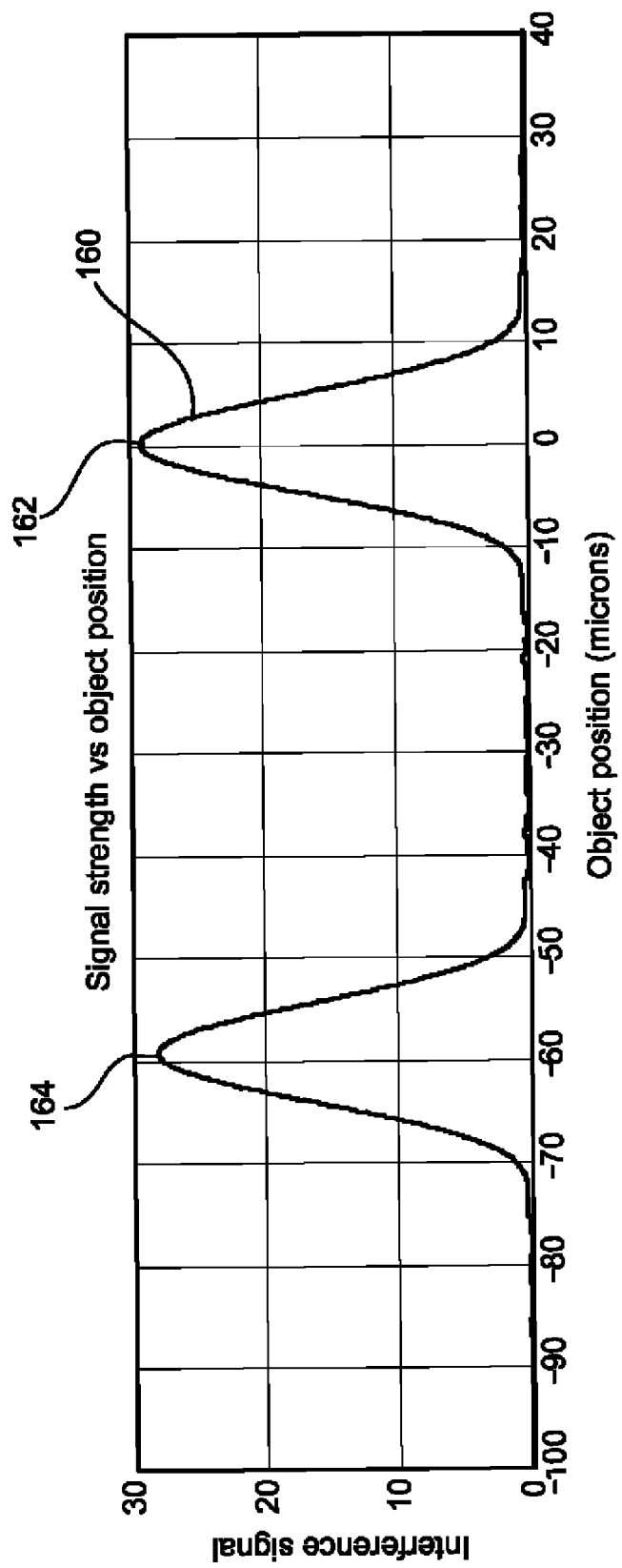

FIG. 6 shows an example interference signal strength 160 that varies as a function of object position for a 40-micron thick fused-silica object when measured with a spectrally-broadband (600 nm center wavelength, 15 nm FWHM) light source. A first peak 162 of the interference signal 160 occurs at the zero position. A second peak 164 of the interference signal 160 occurs at −60 microns, which corresponds to a reflection from the back surface of the object.

As can be seen from the graphs in FIGS. 5 and 6, reflections from surfaces on the test object 102 that are more than, e.g., 20 microns away from the surface being measured will have negligible contribution to the interference pattern that is generated when the equal-path condition is satisfied (i.e., the measurement path and reference path have substantially equal path lengths). In the example shown in FIGS. 1-4, light reflected from the front surface 137 and back surface 138 of the test object 102 may all reach the camera 108. Assume that the distance between the front and back surfaces is more than 20 microns. When the interferometer 100 is used to measure the front surface 137, the light reflected from the back surface 138 will likely not have any significant contribution to the interference pattern detected at the camera 108. Similarly, when the interferometer 100 is used to measure the back surface 138, the light reflected from the front surface 137 will likely not have any significant contribution to the interference pattern detected at the camera 108.

Figure 7:
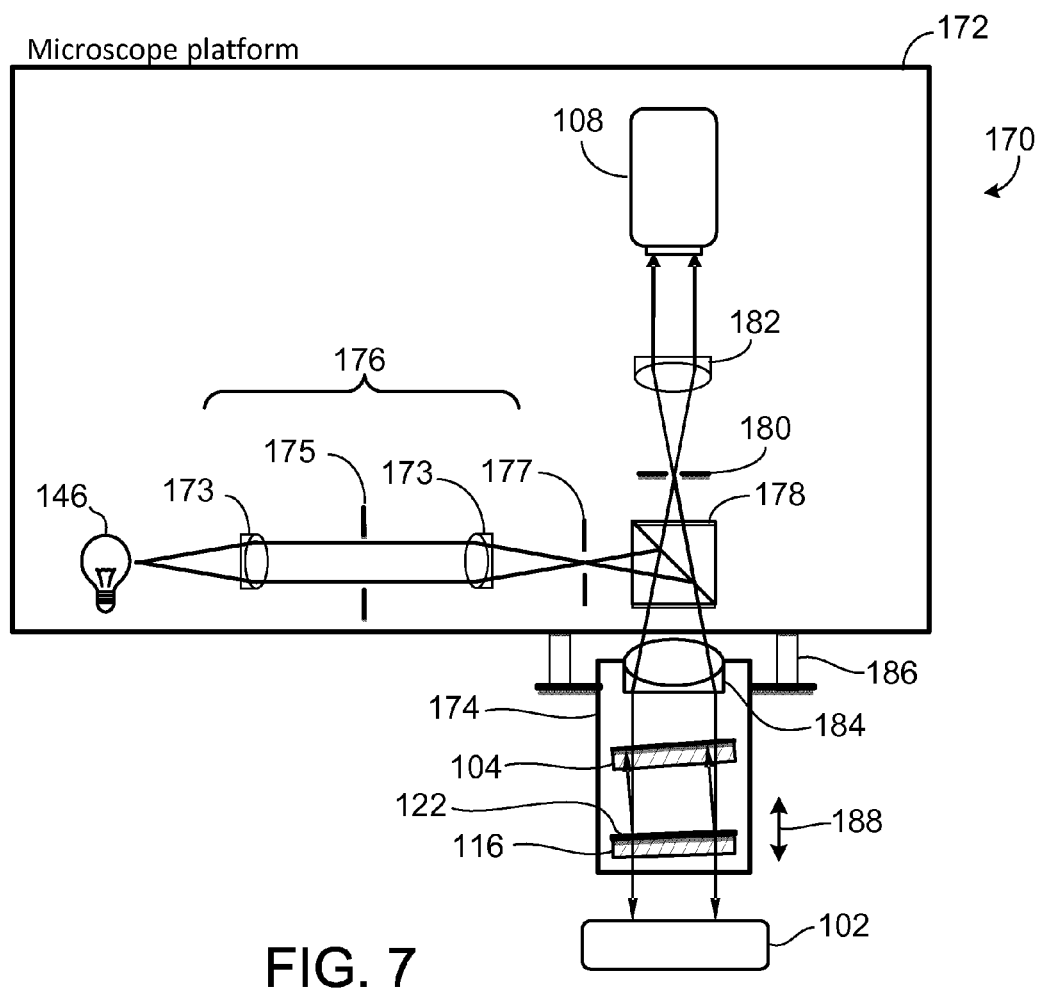
FIG. 7 is a diagram of an example equal-path interferometer adapted for interference microscopy.

Referring to FIG. 7, an equal-path interferometer can be adapted for other instrument platforms, such as interference microscopy. An interference microscope 170 includes a mainframe 172 and a removable interferometer objective 174. The mainframe 172 includes a light source 146 and a lens and field stop assembly 176 (which includes lens 173, a field stop 175, and an illumination aperture stop 177) to collimate, filter, expand, and direct light from the light source 146 towards an illumination beamsplitter 178. The beamsplitter 178 directs the light towards the interference objective 174. The beamsplitter 178 also receives light returned from the interference objective 174, and directs the returned light to a camera 108 through an imaging aperture stop 180 and a tube lens 182.

The interference objective 174 includes an objective lens 184, an interferometer beamsplitter 116, and a reference element 104. To view (or measure) a particular surface of an object 102, a mechanical scanning mechanism 186 scans the interference objective 174 along a direction 188 to adjust the distance between a PR surface 122 of the beamsplitter 116 and the surface of the object 102 being viewed. The removable interferometer objective 174 can take the place of Mirau-, Michelson- or Linnik-type interference objectives used in other systems. Because the microscope 170 uses an equal-path interferometer, it is useful for scanning white light interferometry. The interference objective 174 can be more compact than either the Michelson- or Linnik-type interference objectives.

Figure 8:
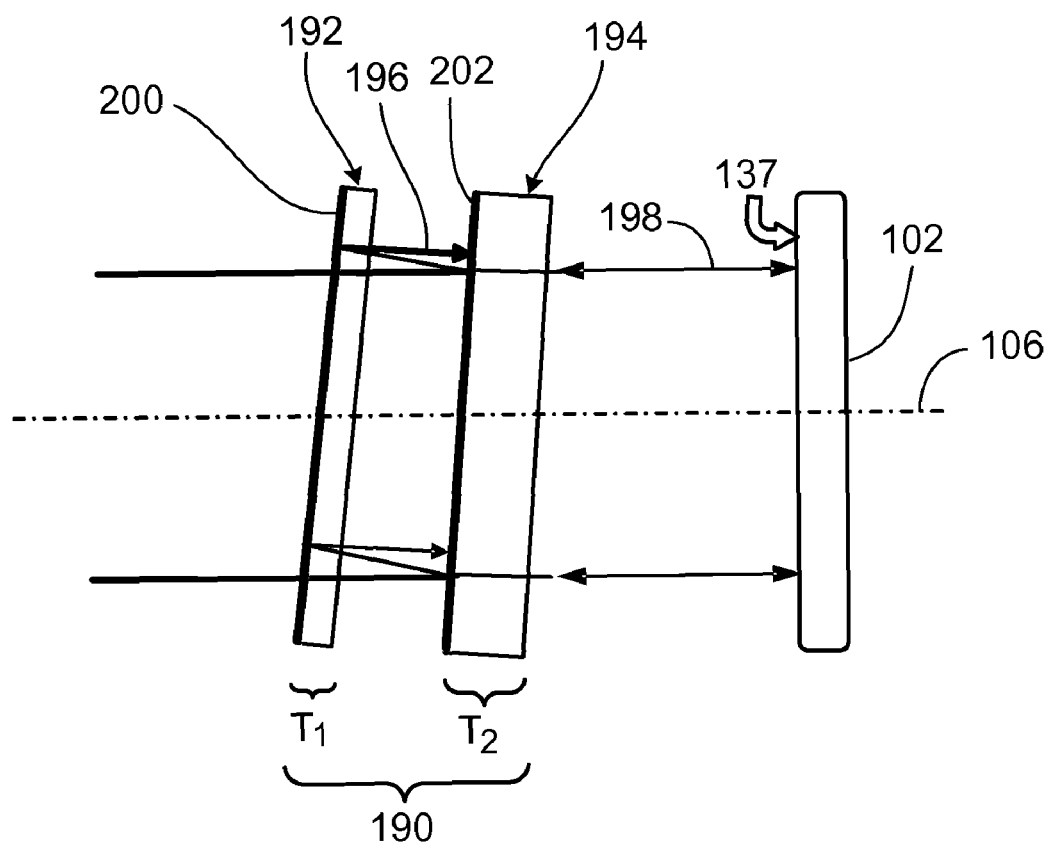
FIG. 8 is a diagram of an example optical assembly.

Referring to FIG. 8, in some implementations, an optical assembly 190 for use in an equal-path interferometer includes a reference element 192 and an interferometer beamsplitter 194. The interferometer beamsplitter 194 is tilted by an angle α with respect to an orientation perpendicular to an optical axis 106, and the reference element 192 is tilted by an angle 1.5α with respect to an orientation perpendicular to the optical axis 106. Under this configuration, a reference beam 196 reflects a total of two times from a PR surface 200 of the reference element 192 and three times from a PR surface 202 of the interferometer beamsplitter 194. The reference beam 196 travels round-trip twice between the PR surface 202 of the beamsplitter 194 and the PR surface 200 of the reference element 192 before the reference beam 196 combines with the measurement beam 198.

The thickness T1 of the reference element 192 is half the thickness T2 of the beamsplitter 194, so that the reference beam 196 and a measurement beam 198 pass through equal amounts of glass. The distance between the PR surface 202 of the beamsplitter 194 and the front surface 137 of the object 102 being measured can be about twice the distance between the PR surface 202 of the beamsplitter 194 and the PR surface 200 of the reference element 192. The optical assembly 190 can be used with an instrument mainframe, similar to the example in FIG. 4, or be used in an interference microscope, similar to the example in FIG. 7.

An advantage of the optical assembly 190 is that it provides increased working distance between the beam splitter 194 and the test object 102, as compared to the examples shown in FIGS. 1-4 and 7.

In some implementations, the interferometer beamsplitter (e.g., 116 or 194) and the reference element (e.g., 104 or 192) can be non-planar. For example, if the test object 102 is spherical, the PR reference surface (e.g., 118 or 200) of the reference element (e.g., 104 or 192) may be of comparable spherical shape.

Figure 9:
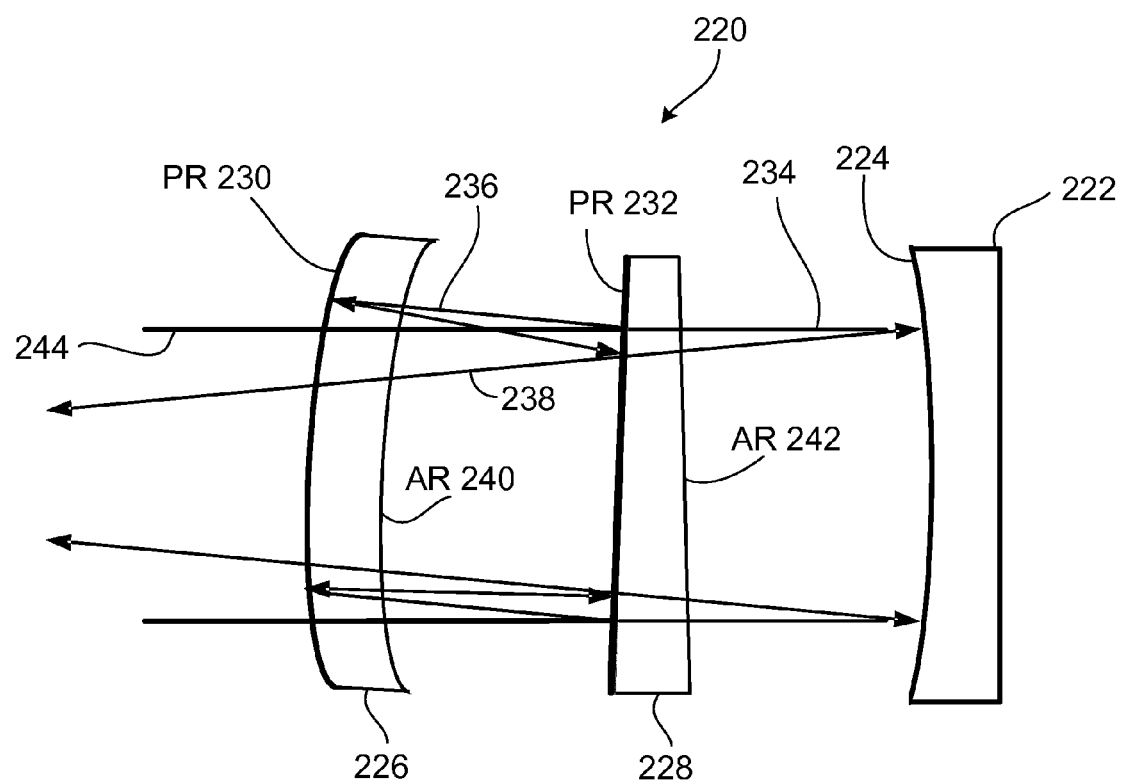
FIG. 9 is a diagram of an example optical assembly for measuring a non-planar surface.

FIG. 9 shows an example interferometer 220 for measuring a non-planar (e.g., spherical concave) surface 224 of a test object 222. The interferometer 220 includes a wedge shaped reference element 226 and a wedge shaped interferometer beamsplitter 228. The beamsplitter 228 has a PR surface 232 and an AR surface 242. The reference element 226 has a PR surface 230 and an AR surface 240, in which the PR surface 230 and the surface 224 of the test object 222 are symmetrical with respect to the PR surface 232 of the beamsplitter 228. The PR surface 232 splits an incoming beam 244 into a measurement beam 234 and a reference beam 236 that travel equal path lengths before combining at the PR surface 232 to form overlapping beams 238. The interference pattern of the overlapping beams 238 can be analyzed to provide information about, e.g., whether the surface 224 of the test object 222 matches or deviates from a desired surface profile represented by the PR surface 230 of the reference element 226.

In the interferometer 100, an imaging module or system (including the imaging lens 136 and the camera 108) for capturing and recording the interference patterns has a certain depth of focus such that objects outside of the depth of focus become out of focus and appear blurry in the images captured by the camera 108. In some implementations, the interferometer can be configured to have certain components placed outside the depth of focus of the imaging system to relax the requirements on the quality of the components. For example, if a glass substrate is outside of the depth of focus of the imaging system, imperfections of the glass substrate become out of focus and have a small or negligible effect on the interference patterns captured by the camera 108. This allows the use of lower cost components to reduce the overall cost of the system while still maintaining high performance.

Figure 10:
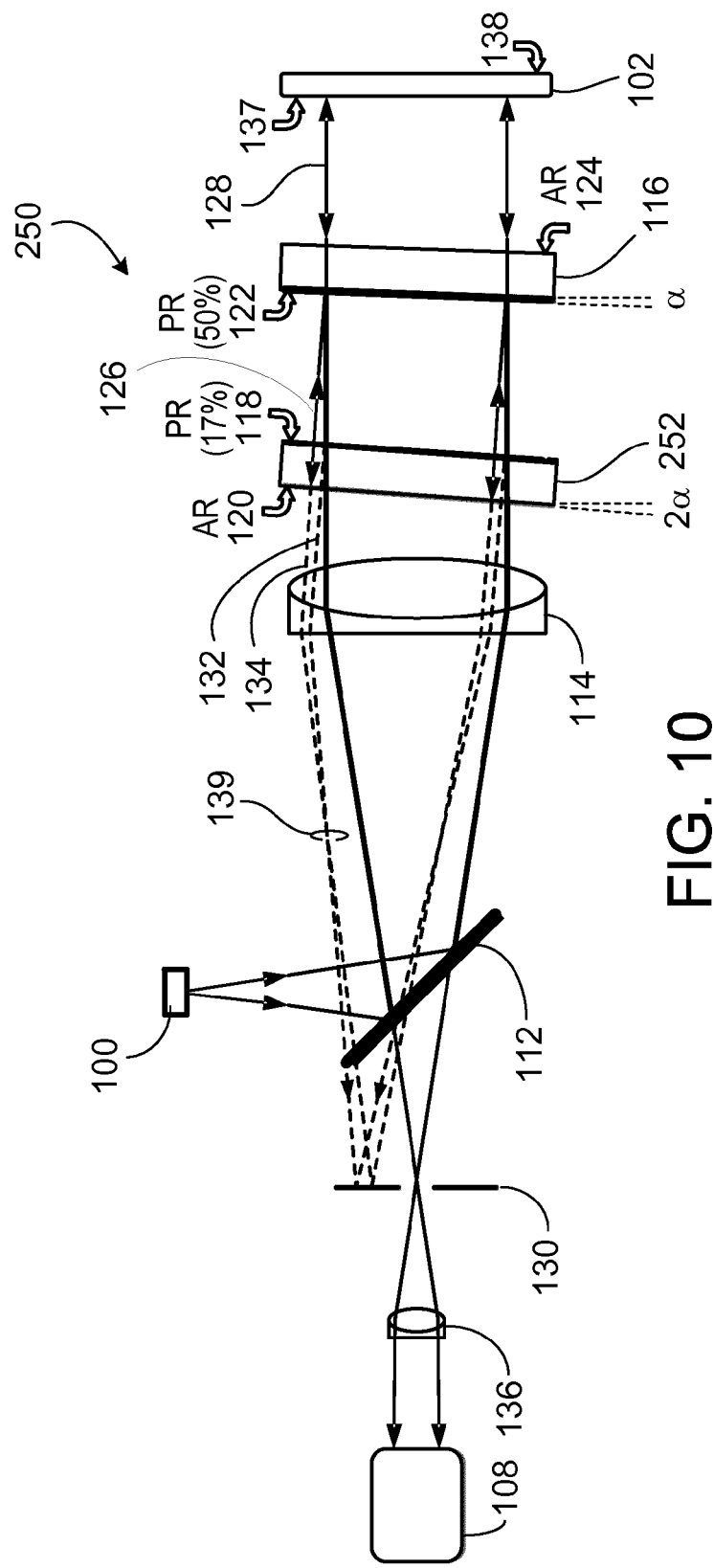
FIGS. 10 and 11 are diagrams of example interferometers for measuring surfaces of objects.

Referring to FIG. 10, in some implementations, an interferometer 250 has a configuration similar to that of the interferometer 100 (FIG. 1), except that the interferometer 250 includes a reference element 252 that is flipped over compared to the reference element 104 of interferometer 100. The reference element 252 has an antireflective coating 120 on a surface facing the collimator 114 and a partially reflecting coating 118 on a surface facing the interferometer beamsplitter 116. The input light from the light source 160 encounters the AR coating 120 before encountering the PR coating 118. Such a configuration may have the advantage that there are no glass elements within the depth of focus of the imaging system of the interferometer 250.

In this example, the depth of focus is defined by the wavelength of the light divided by the square of the numerical aperture. For example, at a wavelength of 500 nm, the depth of focus of an imaging system that has a numerical aperture of 0.005 is 20 mm. The imaging system is designed to project a pattern of interference between light reflected from the PR surface 118 of the reference element 252 and light reflected from a surface on or in the object 120, so the center of focus is at the PR surface 118 of the reference element 252 and the surface of the object 120 being measured. When the beamsplitter 116 and the reference element 104 are positioned to be separated by more than the depth of focus (20 mm in this example), the beamsplitter substrate becomes out of focus. This can relax requirements on the quality of the glass substrates used in the interferometer 250, particularly at high spatial frequencies.

Figure 11:
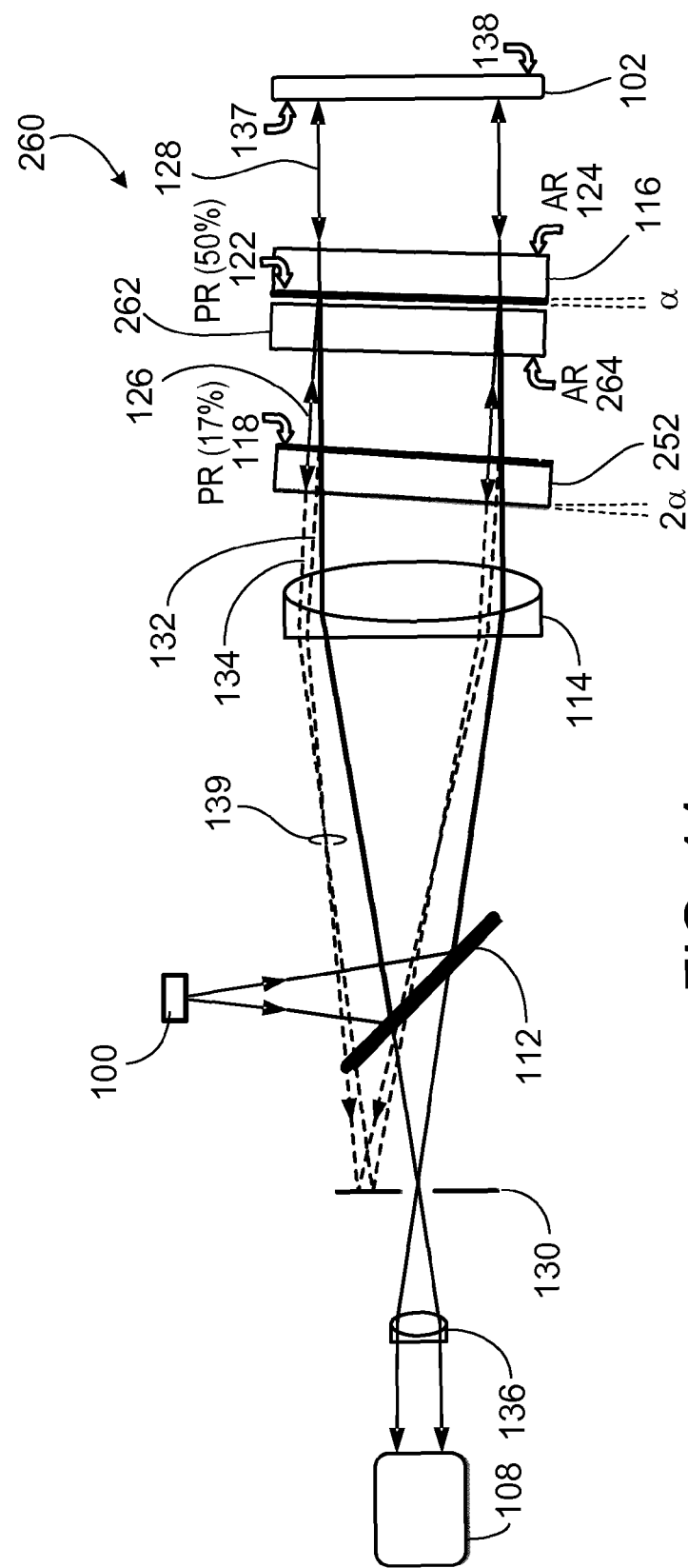

Referring to FIG. 11, in some implementations, an interferometer 260 has a configuration that is similar to that of the interferometer 250 (FIG. 10), with an additional optical element, such as a dispersion compensator 262, positioned between the PR surface 118 of the reference element 252 and the PR surface 122 of the beamsplitter 116. The additional optical element may partly or fully compensate for phase differences between the reference beam 126 and measurement 128 caused by the differences in materials encountered by the beams 126 and 128.

For example, in the interferometer 250 of FIG. 10, although the distances traveled by the beams 126 and 128 are the same, the measurement beam 128 passes through more glass than the reference beam 126. As another example, if the thickness of the reference element 252 is different from the thickness of the interferometer beamsplitter 116, there may be a phase difference between the beams 126 and 128 even though the beams travel the same distances. The additional optical element (e.g., the dispersion compensator 262) may partly or fully compensate for the phase differences between the beams 126 and 128. The additional optical element may be placed outside of the depth of focus of the imaging system, relaxing the requirements on the quality of the additional optical element. In the example of FIG. 11, the dispersion compensator 262 is placed closer to the beamsplitter 116 than the reference element 118 so that the dispersion compensator 262 is outside the depth of focus of the imaging system (the center of focus being at the PR surface 118 of the reference element 252).

Figure 12A:
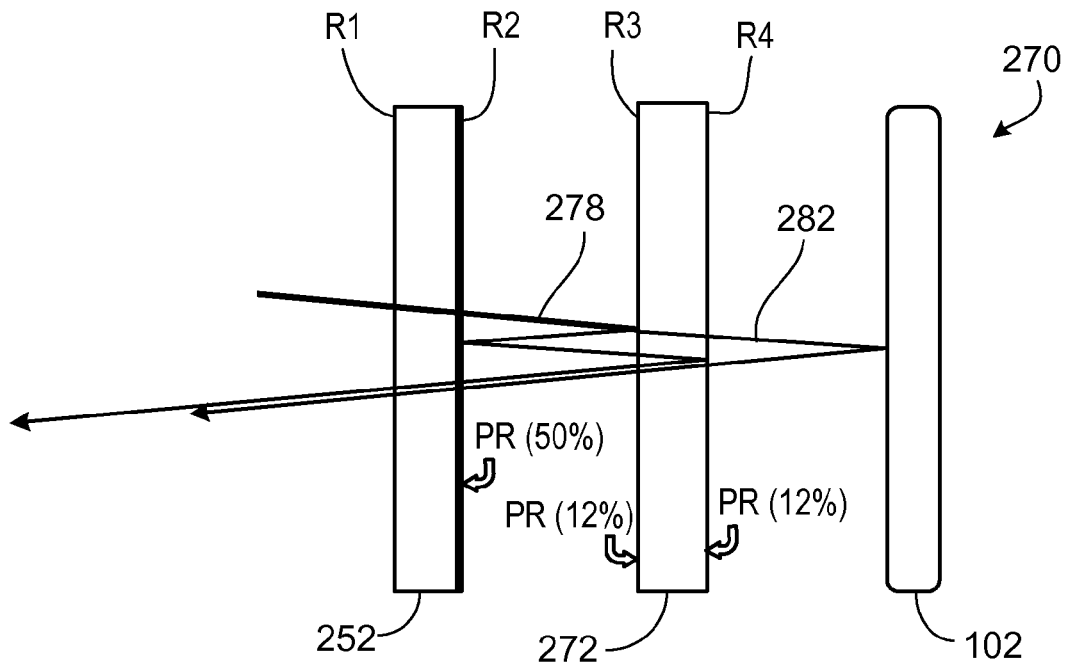
FIGS. 12A and 12B are diagrams of an example optical assembly that can be used in an interferometer.

Referring to FIG. 12A, in some implementations, an interferometer includes an optical assembly 270 that uses reflections alternatively from the front and back surfaces of the interferometer beamsplitter to provide substantially equal paths through glass for a measurement beam and two reference beams that produce three-beam interference patterns. The optical assembly 270 includes a reference element 252 and an interferometer beamsplitter 272. The reference element 252 has an anti-reflective surface R1 and a partially reflective surface R2 (having about 50% reflectivity). The beamsplitter 272 has two partially reflective surfaces R3 and R4 (each having about 12% reflectivity). The surfaces R1, R2, R3, and R4 are positioned in sequence.

The example in FIG. 12A is illustrated without tilting the reference element and the beamsplitter to reject unwanted reflections, and with non-parallel input and output beams, so as to make the beam paths easier to observe. A first portion of the light is transmitted through surfaces R1 and R2, and reflected at the surface R3, forming a first reference beam A 278. The first reference beam 278 partially reflects from the surface R2 and returns to the surface R4, at which point the reference beam A 278 partially reflects in a path that is approximately collinear and coextensive with the original illumination, but traveling in the opposite direction.

Figure 12B:
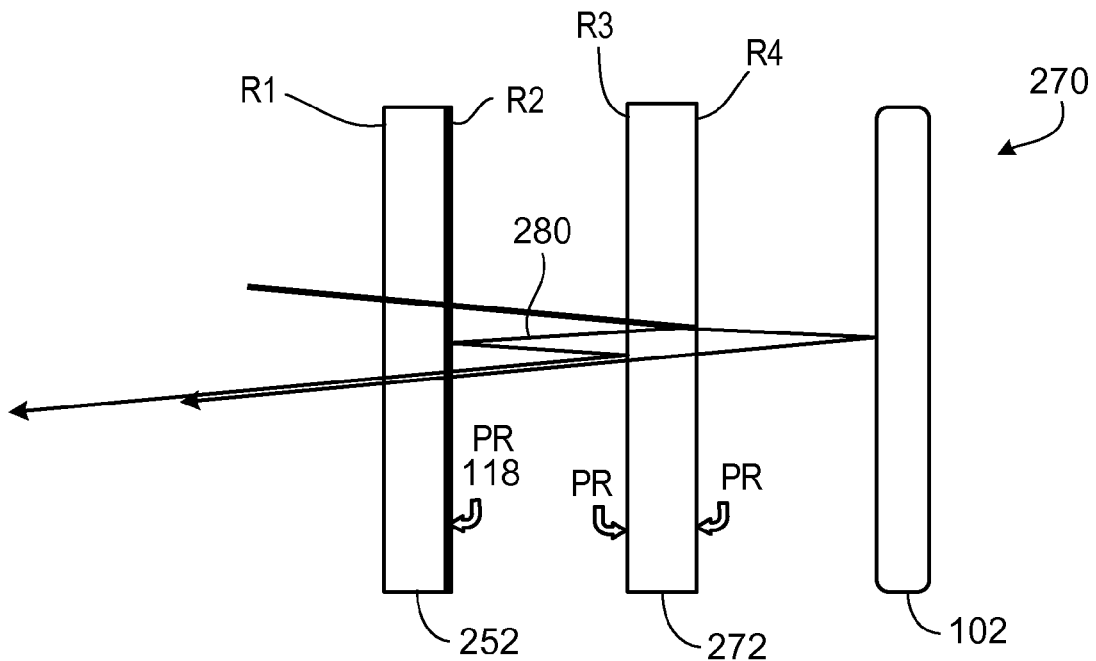

Referring to FIG. 12B, a second portion of the light is transmitted through surfaces R1, R2, and R3, and is reflected at the surface R4, forming a second reference beam B 280. The second reference beam 280 partially reflects from the surface R2 and returns to the surface R3, at which point the reference beam B 280 partially reflects in a path that is approximately collinear and coextensive with the original illumination, but traveling in the opposite direction.

A third portion of the light transmitted through the surfaces R1, R2, R3, and R4, forming the measurement beam M 282. The measurement beam M 282 combines with the first reference beam A 278 at the surface R4, and with the second reference beam B 280 at the surface R3. The overlapping beams travel toward the camera 108, which detects interference among the first reference beam A 278, the second reference beam B 280, and the measurement beam M 282.

The following describes a method for determining the reflectivities of surfaces R2, R3, and R4 to achieve a high (e.g., maximum) contrast of the three-beam interference pattern. Disregarding for the moment all spurious reflections, the interference intensity for a single image point is:

$$I = |E_A + E_B + E_M|^2 \quad (1)$$

where $E_A, E_B, E_M$ are the complex electric field amplitudes for the reference beam A 278, reference beam B 280, and measurement beam M 282, respectively. Denote the complex reflectivities of the surface R1 ... R4 as $r_{1...4}$, and the transmissivities of these same surfaces as $t_{1...4}$, respectively. Tracing the two reference beams A and B through the system, we have for an input field $E_0$ $$E_A = E_0 t_1 t_2 r_3 r_2 t_3 r_4 t_3 t_2 t_1 \quad (2)$$

$$E_B = E_0 t_1 t_2 t_3 r_4 t_3 r_2 r_3 t_2 t_1 e^{i\phi} \quad (3)$$

where $\phi$ is the phase offset related to the optical path difference (OPD) between the two reference beams A and B. Equations (2) and (3) simplify to $$E_A = E_0 t_1^2 t_2^2 t_3^2 r_2 r_3 r_4 \quad (4)$$

$$E_B = E_A e^{i\phi}. \quad (5)$$

Assuming that the beamsplitter surfaces R2 and R3 are perfectly parallel, the optical path difference-related phase $\phi=0$ and there is constructive interference of the two reference beams, we can write an equivalent reference beam field as $$E_R = 2E_A. \quad (6)$$

The measurement field is $$E_M = E_0 t_1^2 t_2^2 t_3^2 t_4^2 r_M e^{i\theta}. \quad (7)$$

The intensity I in Equation (1) simplifies to the two-beam equivalent $$I = |E_R + E_M|^2, \quad (8)$$

resulting in the familiar intensity formula $$I = I_R + I_M + 2\sqrt{I_R I_M} \cos(\theta), \quad (9)$$

where $$I_R = 4T_1^2 T_2^2 T_3^2 R_2 R_3 R_4 \quad (10)$$

$$I_M = T_1^2 T_2^2 T_3^2 T_4^2 R_M \quad (11)$$

for $$T_{1...4} = |t_{1...4}|^2 \quad (12)$$

$$R_{1...4} = |r_{1...4}|^2 \quad (13)$$

$$R_M = |r_M|^2 \quad (14)$$

The reference beam net intensity $|E_R|^2$ is 4 times the intensity of either one of the reference reflections (A) or (B) taken alone, which means that the beamsplitter reflectivities $R_3, R_4$ need not be very high to achieve good fringe contrast. Defining the fringe contrast as $$V = \frac{2\sqrt{I_R I_M}}{I_R + I_M}, \quad (15)$$

maximum fringe contrast V=1 is achieved for $I_R = I_M$. Using Equations (10) and (11), the maximum contrast can be achieved when $$T_1^2 T_2^2 T_3^2 T_4^2 R_M = 4 T_1^2 T_2^2 T_3^2 R_2 R_3 R_4 \quad (16)$$

which simplifies to $$T_4^2 R_M = 4 R_2 R_3 R_4. \quad (17)$$

As a specific example, let the object 120 be a bare-glass surface with a 4% reflection, a reference surface (R2) reflectivity of 50%, and equal reflectivities for R3 and R4, and dielectric coatings to achieve 0% reflectivity for R1. In this case, $$R_1 = 0$$

$$R_2 = 50\%$$

$$R_4 = R_3$$

$$R_M = 4\%. \quad (18)$$

For a fringe contrast V=1, $$2R_4^2 - (1-R_4)^2 4\% = 0 \quad (19)$$

which has the solution $R_4 = 12.4\%$. Higher reflectivity objects may benefit from a higher beamsplitter reflectivity. For example, a beamsplitter reflectivity of $R_3 = R_4 = 28\%$ provides maximum contrast for an object reflectivity of 30%.

In the calculations above, it has been assumed that there are no other reflections reaching the instrument imaging system other than the measurement beam and the two reference beams A and B. Similar to the examples shown in FIGS. 10 and 11, the reference element 252 and the beamsplitter 272 in the optical assembly 270 can be tilted to reduce or eliminate unwanted reflections and to result in parallel input and output beams.

Figure 13:
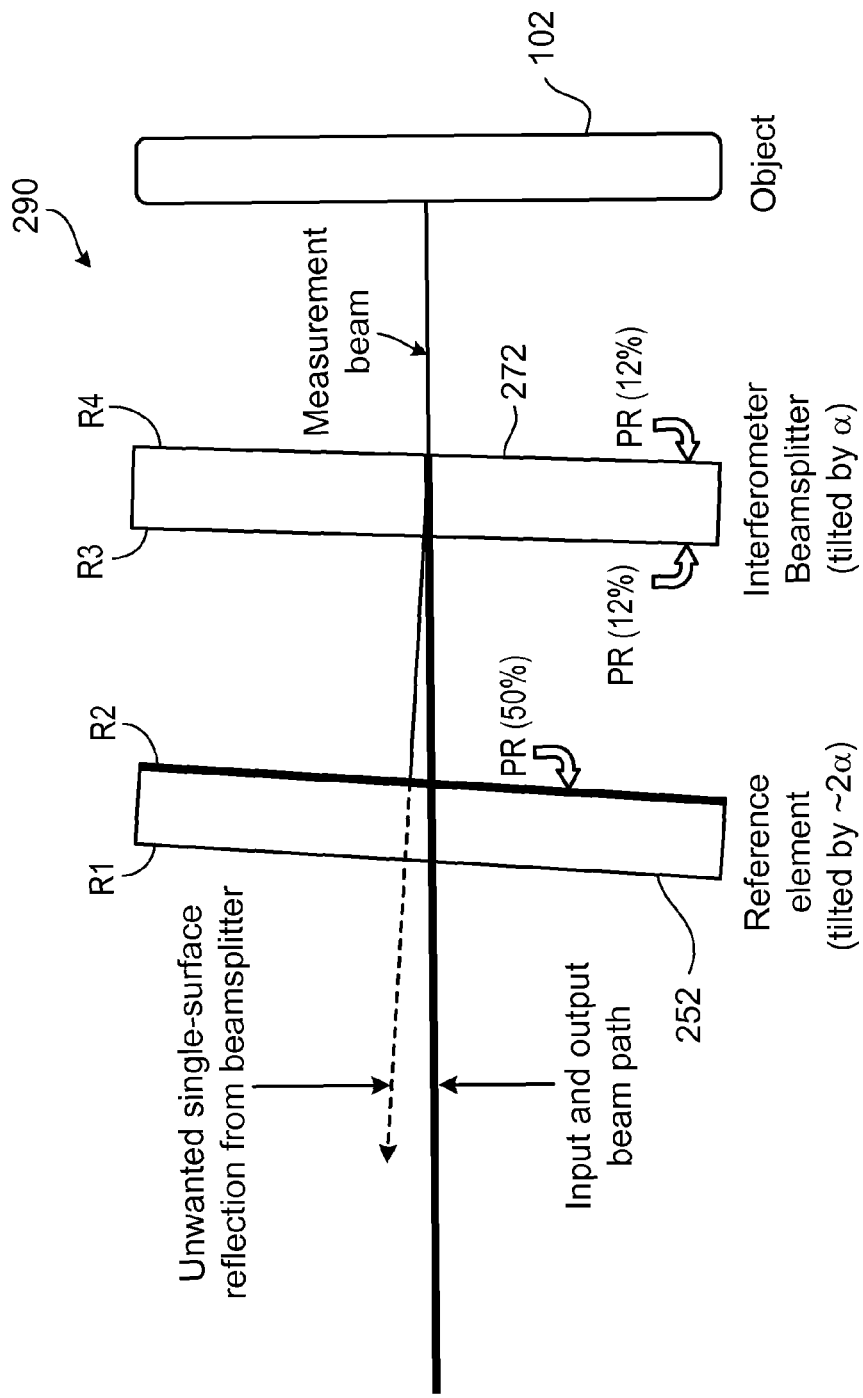
FIG. 13 is a diagram of an example optical assembly that can be used in an interferometer.

Referring to FIG. 13, in some implementations, an optical assembly 220 includes a plane-parallel beamsplitter 272 that is tilted by an angle $\alpha$, and the reference element 252 that is tilted by an angle approximately equal to $2\alpha$. In this example, unwanted single-surface reflections from surfaces R3 and R4 are not returned parallel to the output beam paths.

There remains an unintended beam from surface R4 reflecting from surface R2 and again from surface R4 into the output beam. There remains also an unintended beam from surface R3 reflecting from surface R2 and again from surface R3 into the output beam. These beams do not have the correct path length to generate interference when the illumination is of low spatial and temporal coherence; therefore, they merely add background light to the image and do not otherwise disturb the desired interference pattern. The net effect can be a reduction in relative fringe contrast by, for example, 20%.

Figure 14:
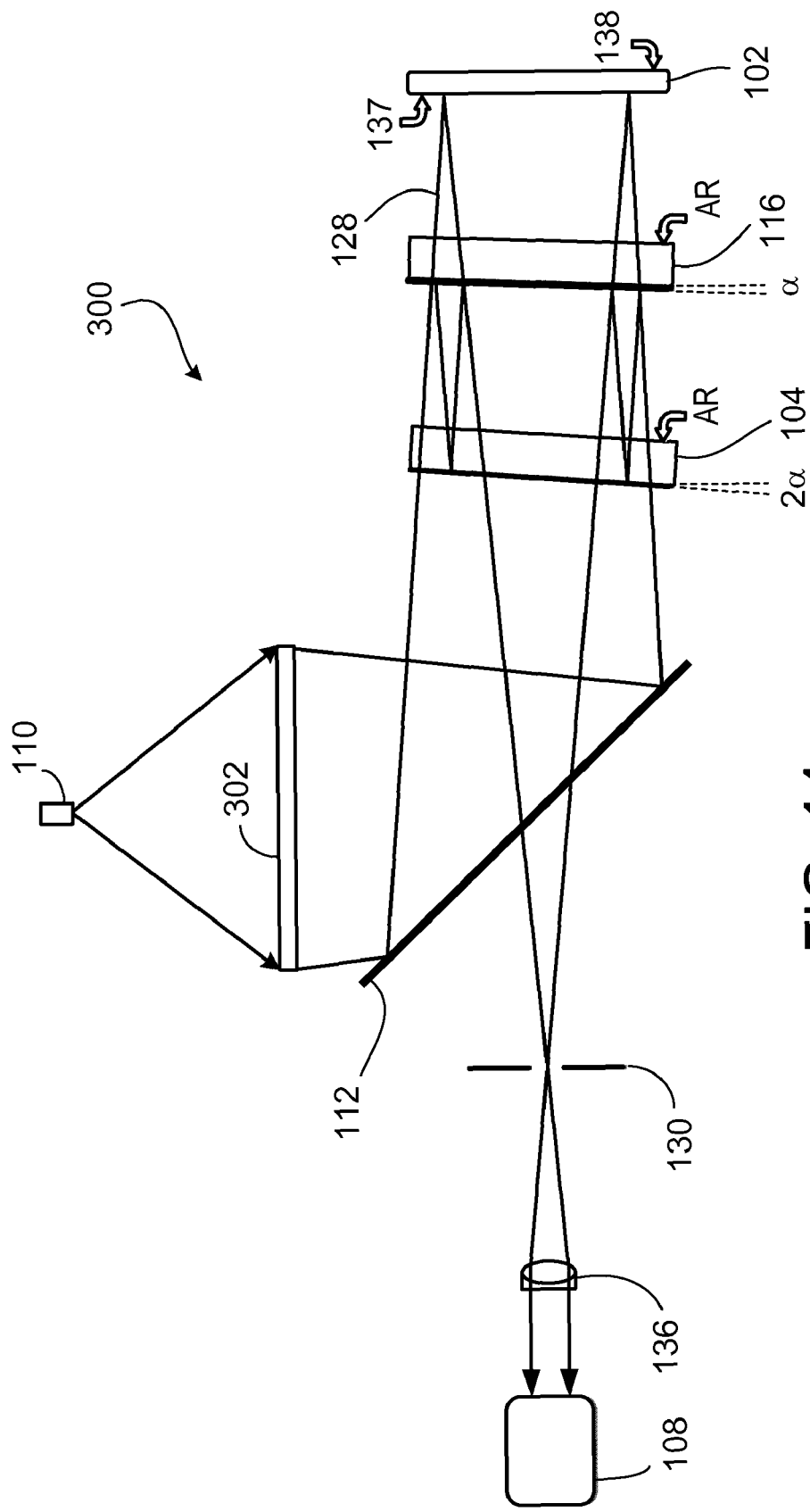
FIG. 14 is a diagram of an example interferometer for measuring a surface of an object.

Referring to FIG. 14, in some implementations, an interferometer 300 is provided by modifying the interferometer 100 to use a field lens 302 outside of the imaging path, instead of using the collimator 114. The object 120 is imaged directly to the camera 108 without having a collimator in this critical path. The field lens 302 may, for example, be positioned between the light source 110 and the illumination beamsplitter 112. Because the field lens 302 does not take part in the imaging of the object 120 and the reference element 104, the field lens 302 need not be of the same quality as the collimator 114, while still allowing the interferometer 300 to obtain accurate measurements. The field lens 210 may be, for example, a diffractive or Fresnel lens.

In the example shown in FIG. 1, in order to measure the surface properties of a large object 120, a large collimator 114 may need to be used to provide a sufficiently large light field. Large format, high quality collimators can be expensive. In the example shown in FIG. 14, by using a large format field lens 300, which can be considerably cheaper than a large format collimator 114, significant cost savings can be achieved in manufacturing the interferometer 300.

The interferometers shown in FIGS. 4, 10, and 11 can also be modified to use a field lens instead of a collimator.

The interferometers described above can be used to measure the properties of many types of object surfaces, for example, disk flatness and disk waviness of glass disks used in hard disk drives. The glass disk has front and rear reflecting surfaces. The interferometers described above use light sources that have low spatial coherence such that a reflection from the rear reflecting surface will have negligible contribution to the interference pattern generated from the interference between the measurement light reflected from the front disk surface and the reference light reflected from the reference surface. The interferometers can also be used to measure other types of disk media surfaces.

Other aspects, features, and advantages are within the scope of the invention. For example, in FIG. 1, a mount can be provided to support the test object 102. The mount can be adjustable, and is configured to position the test object 102 to define an optical path length for the measurement beam 128 that is substantially equal to an optical path length for the reference beam 126. The orientation of the wedged reference element 210 of FIG. 2 can be flipped such that the PR surface 220 faces the interferometer beamsplitter 212. The orientation of the reference element 192 of FIG. 8 and reference element 226 of FIG. 9 can be flipped such that the PR surface of the reference element faces the interferometer beamsplitter. The configuration of the reference element and interferometer beamsplitter in the interferometer sub-assembly 140 in FIG. 4 and the interference objective 174 of FIG. 7 can be replaced by other configurations, such as those shown in FIGS. 8, 9, 10, 11, 12A, 12B, and 13. The tilt angles of the reference element and the interferometer beamsplitter can be different from those described above. The partially reflective surfaces of the reference element and the interferometer beamsplitter can be formed at respective internal interfaces within the optical elements, and do not necessarily have to be at the outer surfaces as shown in FIGS. 1-4 and 7-14.

What is claimed is:

1. An optical assembly for use in an interferometer, the optical assembly comprising:
   first and second partially reflective surfaces positioned along an optical axis and oriented at different non-normal angles to the optical axis,
   wherein the second partially reflective surface is configured to:
   i) receive light transmitted through the first partially reflective surface along the optical path;
   ii) transmit a portion of the received light to a test object to define measurement light for the interferometer; and
   iii) reflect another portion of the received light back towards the first partially reflective surface to define reference light for the interferometer, wherein the reference light makes at least one round trip path between the second and first partially reflective surfaces.

2. The optical assembly of claim 1, wherein the non-normal angles cause the reference light to pass between the first and second partially reflective surfaces at least one time before the second partially reflective surface reflects the reference light back along the optical axis.

3. The optical assembly of claim 2, wherein the non-normal angles cause the reference light to contact one of the partially reflective surfaces at normal incidence during one of the passes there between.

4. The optical assembly of claim 1, wherein the non-normal angle for the first partially reflective surface is two times the non-normal angle for the second partially reflective surface.

5. The optical assembly of claim 1, wherein the non-normal angle for the first partially reflective surface is one and a half times the non-normal angle for the second partially reflective surface.

6. The optical assembly of claim 1, wherein the second partially reflective surface is configured to combine the measurement light, after the measurement light reflects from the test object back to the second partially reflective surface, with the reference light, after the reference light makes the at least one round trip between the second and first partially reflective surfaces.

7. The optical assembly of claim 1, comprising a first optical element having the first partially reflective surface; and a second optical element having the second partially reflective surface.

8. The optical assembly of claim 7, wherein the first and second optical elements each has another surface having an anti-reflection coating.

9. The optical assembly of claim 7, wherein the first partially reflective surface is spaced away from the second partially reflective surface at a distance that is greater than a depth of focus of an imaging module that captures an interference pattern between the reference light and the measurement light.

10. The optical assembly of claim 9, wherein optical elements of the interferometer are positioned such that the reference light does not pass through glass within the depth of focus of the imaging module.

11. The optical assembly of claim 7, wherein the first optical element has another surface having an anti-reflection coating.

12. The optical assembly of claim 11, wherein the first optical element is oriented such that the first partially reflective surface faces towards the second partially reflective surface of the second optical element, and the anti-reflection coating of the first optical element faces away from the second partially reflective surface.

13. The optical assembly of claim 12, wherein a distance between the first partially reflective surface and the second partially reflective surface is greater than a depth of focus of an imaging module for capturing an interference pattern between the reference light and the measurement light.

14. The optical assembly of claim 13, further comprising a dispersion compensator positioned between the first optical element and the second optical element to compensate for a phase difference between the measurement light and the reference light, the dispersion compensator being positioned closer to the third optical element and outside of the depth of focus of the imaging system.

15. The optical assembly of claim 11, wherein the first optical element is oriented such that the first partially reflective surface faces away from the second partially reflective surface of the second optical element, and the anti-reflection coating of the first optical element faces towards the second partially reflective surface.

16. The optical assembly of claim 7, wherein the partially reflective surfaces are on outer surfaces of the optical elements respectively.

17. The optical assembly of claim 7, wherein the partially reflective surfaces are formed at respective internal interfaces within the optical elements.

18. The optical assembly of claim 1, further comprising a third partially reflective surface.

19. The optical assembly of claim 18, wherein the third partially reflective surface is configured to:
   i) receive light transmitted through the first partially reflective surface along the optical path;
   ii) transmit a portion of the received light to the test object to define the measurement light; and
   iii) reflect another portion of the received light back towards the first partially reflective surface to define a second reference light for the interferometer, wherein the second reference light makes at least one round trip path between the second and first partially reflective surfaces.

20. The optical assembly of claim 1, further comprising a collimator to receive light from a light source and project collimated light to the first partially reflective surface.

21. The optical assembly of claim 1, further comprising a field lens to receive light from a light source and project the light to the first partially reflective surface, the field lens being positioned outside of an imaging path traveled by the reference light after the reference light is reflected by the first partially reflective surface and before the reference light is detected by a detector.

22. The optical assembly of claim 1, wherein the first partially reflective surface has a reflectivity in the range of about 10% to about 30%.

23. The optical assembly of claim 1, wherein second partially reflective surface has a reflectivity in the range of about 40% to about 60%.

24. The optical assembly of claim 1 in which the first partially reflective surface comprises a non-planar surface.

25. An interferometry system comprising:
   the optical assembly of claim 1; and
   an interferometer base comprising a light source and a detector;
   wherein the light source is configured to produce the light transmitted through the first partially reflective surface and received by the second partially reflective surface, and
   wherein the detector is configured to receive combined light comprising the measurement light and the reference light and provide information about a spatial distribution of the combined light.

26. The interferometry system of claim 25, wherein the interferometer base further comprises an aperture stop positioned to block light from the interferometer base that contacts the first partially reflective surface along the optical axis and reflects from the first partially reflective surface back to the interferometer base.

27. The interferometry system of claim 25, wherein the interferometer base further comprises an aperture stop positioned to block light from the interferometer base that contacts the first partially reflective surface along the optical axis and reflects from the first partially reflective surface back to the interferometer base.

28. The interferometry system of claim 25, further comprising a mount for supporting the test object.

29. The interferometry system of claim 25, wherein the mount is positioned to define an optical path length for the measurement light that is substantially equal to an optical path length for the reference light.

30. The interferometry system of claim 25, further comprising a phase shifter for varying the optical path length difference between the measurement light and the reference light.

31. The interferometry system of claim 30, wherein the phase shifter mechanically couples the interferometer base to the optical assembly and is configured to vary the distance between the optical assembly and the test object to vary the optical path length for the measurement light.

32. The interferometry system of claim 25, wherein the source is a broadband source for providing low-coherence interferometry measurements.

33. The interferometry system of claim 25, wherein the source is a narrow-band laser source.

34. The interferometry system of claim 25, wherein the source is adjustable between a broadband mode for low-coherence interferometry and a laser mode for high-coherence interferometry.

35. The interferometry system of claim 34, wherein the source is a laser diode that operates in the broadband mode when driven at a current below its laser threshold and operates in the laser mode when driven at a current above its laser threshold.

36. An interferometry method comprising:
   positioning first and second partially reflective surfaces along an optical axis;
   orienting the first and second partially reflective surfaces at different non-normal angles relative to the optical axis;
   transmitting light through the first partially reflective surface along a direction parallel to the optical axis to the second partially reflective surface;
   at the second partially reflective surface, transmitting a first portion of the light to a test object to define measurement light, and reflecting a second portion of the light back towards the first partially reflective surface to define reference light; and
   at the first partially reflective surface, reflecting a portion of the second portion of the light towards the second partially reflective surface such that the reference light makes at least one round trip path between the second and first partially reflective surfaces.

37. The method of claim 36, wherein orienting the first and second partially reflective surfaces comprises orienting the first and second partially reflective surfaces at different non-normal angles to cause the reference light to pass between the first and second partially reflective surfaces at least one time before the second partially reflective surface reflects the reference light back along the optical axis.

38. The method of claim 36, wherein orienting the first and second partially reflective surfaces comprises orienting the first and second partially reflective surfaces at different non-normal angles to cause the reference light to contact one of the partially reflective surfaces at normal incidence during one of the passes there between.

39. The method of claim 36, comprising, at the second partially reflective surface, combining the measurement light, after it reflects from the test object back to the second partially reflective surface, with the reference light, after it makes the at least one round trip between the second and first partially reflective surfaces.

40. The method of claim 39, comprising providing information about a spatial distribution of the combined light.

41. The method of claim 36, comprising providing an aperture stop to block light that is reflected from the first partially reflective surface in a direction away from the second partially reflective surface.

42. The method of claim 36, comprising positioning a test object having a reflective surface to define an optical path length for the measurement light that is substantially equal to an optical path length for the reference light.

43. The method of claim 42, comprising varying the optical path length difference between the measurement light and the reference light.

44. The method of claim 43, comprising varying the distance between an optical assembly and the test object to vary the optical path length for the measurement light, the optical assembly comprising the first and second partially reflective surfaces.

45. The method of claim 36, further comprising orienting an optical element having the first partially reflective surface at an outer surface of the optical element such that the outer surface of the optical element having the first partially reflective surface faces towards the second partially reflective surface.

46. The method of claim 36, comprising transmitting the reference light from the first partially reflective surface to the second partially reflective surface without passing any glass element.

47. The method of claim 36, comprising positioning the second partially reflective surface at a distance away from the first partially reflective surface, the distance being greater than a depth of focus of an imaging module that detects an interference pattern between the measurement light and the reference light.

48. The method of claim 47, comprising passing the reference light through a dispersion compensator that compensates a difference in phase between the measurement light and the reference light due to differences in optical path lengths traveled by the reference light and the measurement light, and positioning the dispersion compensator outside of the depth of focus of the imaging module.

49. The method of claim 36, further comprising:
positioning a third reflective surface along the optical axis;
orienting the third partially reflective surface to be parallel to the second partially reflective surface;
at the third partially reflective surface, transmitting a third portion of the light transmitted by the first partially reflective surface to the test object to define the measurement light, and reflecting a fourth portion of the light back towards the first partially reflective surface to define a second reference light; and
at the first partially reflective surface, reflecting a portion of the fourth portion of the light towards the second partially reflective surface such that the second reference light makes at least one round trip path between the second and first partially reflective surfaces.

50. The method of claim 36 in which transmitting light through the first partially reflective surface comprises transmitting collimated light through the first partially reflective surface.

51. The method of claim 36, further comprising transmitting the light through a field lens prior to transmitting the light through the first partially reflective surface, and positioning the field lens outside of an imaging path traveled by the reference light after the reference light is reflected by the first partially reflective surface and before the reference light is detected by a detector.

* * * * *

UNITED STATES PATENT AND TRADEMARK OFFICE
CERTIFICATE OF CORRECTION

| | | |
|---|---|---|
| PATENT NO. | : 8,045,175 B2 | Page 1 of 1 |
| APPLICATION NO. | : 12/818753 | |
| DATED | : October 25, 2011 | |
| INVENTOR(S) | : Peter J. De Groot et al. | |

It is certified that error appears in the above-identified patent and that said Letters Patent is hereby corrected as shown below:

On the Title Page, Item (56), under OTHER PUBLICATIONS, line 8, delete "Optice" and insert -- Optics --.

On the Title Page, Item (56), under OTHER PUBLICATIONS, line 10, delete "Applied. Optics" and insert -- Applied Optics --.

Col. 18, line 7, delete "claim 25," and insert -- claim 28, --.

Signed and Sealed this
Twentieth Day of December, 2011

David J. Kappos
*Director of the United States Patent and Trademark Office*